Oct. 28, 1924.
J. ALEXANDER
BALING PRESS
Filed March 24, 1922  2 Sheets—Sheet 1
1,513,573
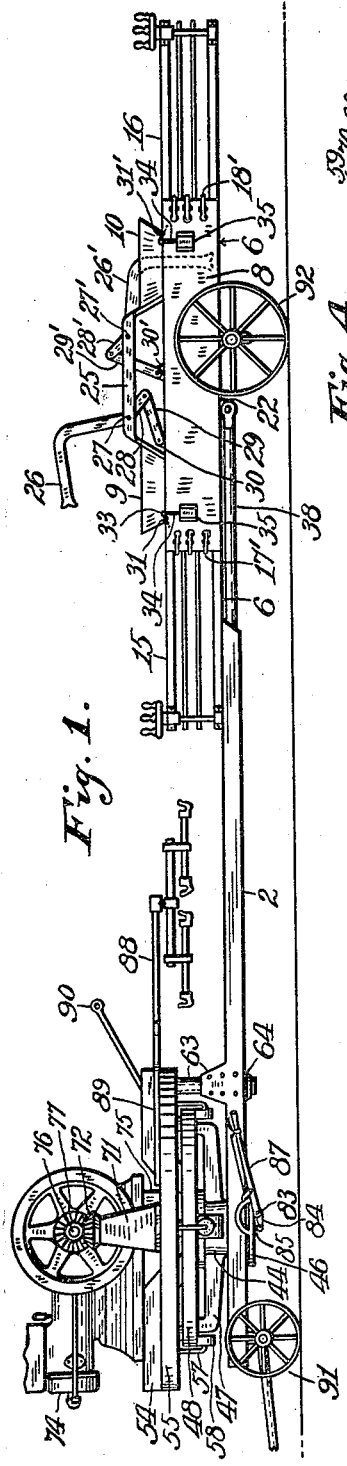
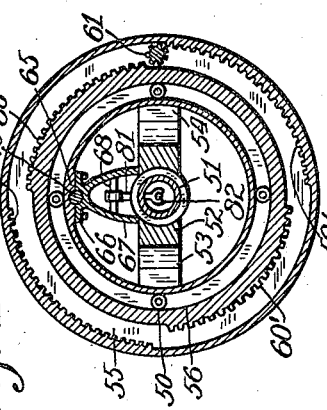
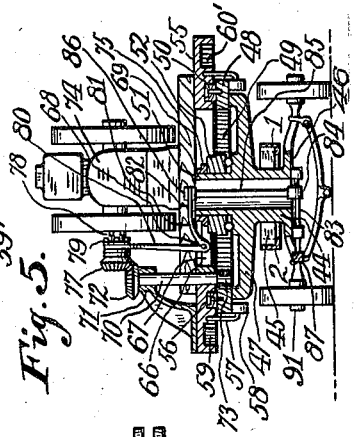
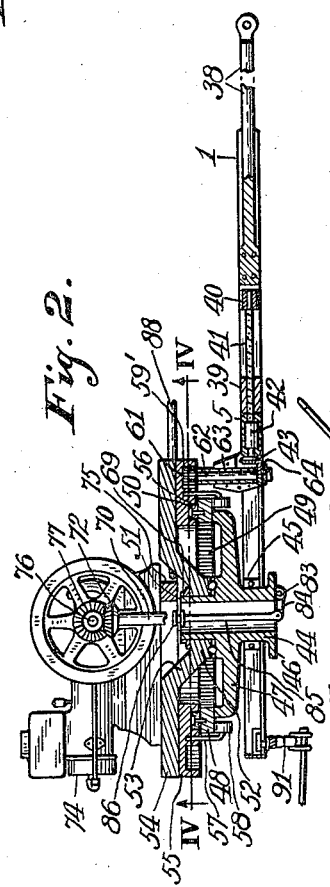
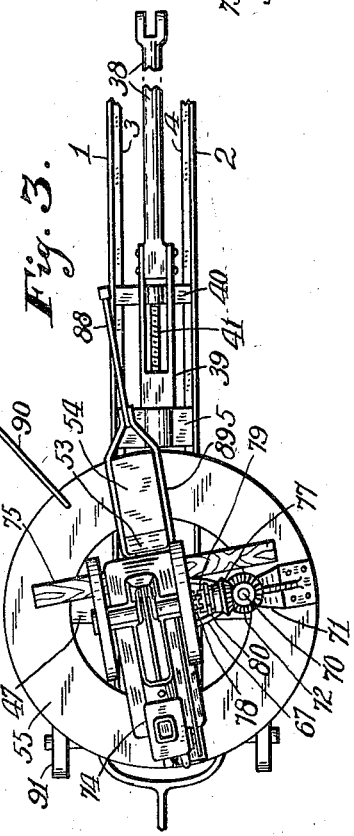
INVENTOR:
Jesse Alexander,
BY
E. P. Silvius,
ATTORNEY.

Oct. 28, 1924.
J. ALEXANDER
BALING PRESS
Filed March 24, 1922  2 Sheets-Sheet 2
1,513,573
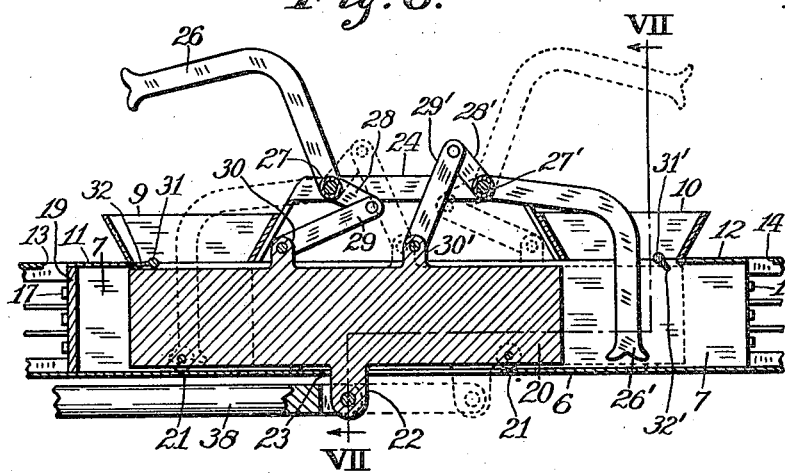
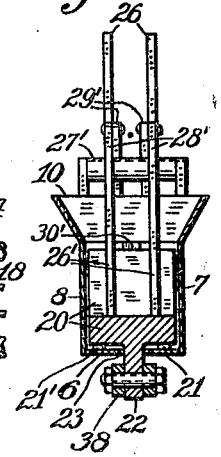
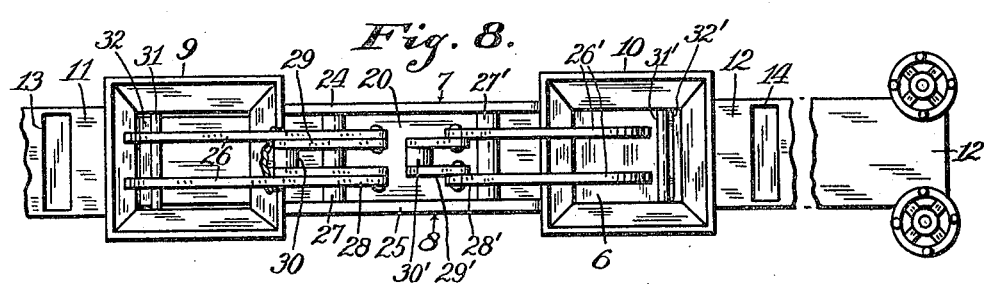
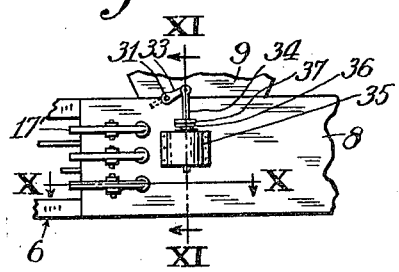
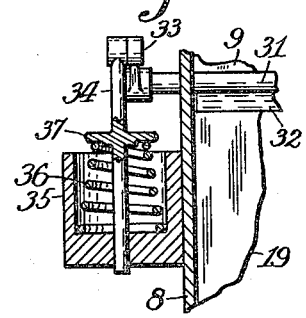
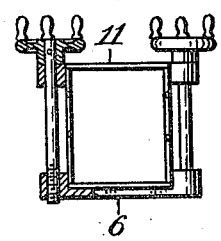
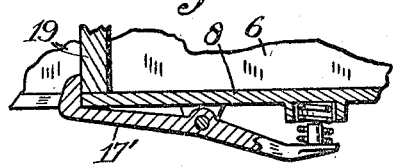
INVENTOR:
Jesse Alexander,
BY
E. D. Silvius,
ATTORNEY.

Patented Oct. 28, 1924.

1,513,573

UNITED STATES PATENT OFFICE.

JESSE ALEXANDER, OF CLINTON TOWNSHIP, VERMILION COUNTY, INDIANA, ASSIGNOR OF ONE-THIRD TO WILLIAM J. HOLLINGSWORTH, OF CLINTON TOWNSHIP, INDIANA.

BALING PRESS.

Application filed March 24, 1922. Serial No. 546,497.

*To all whom it may concern:*

Be it known that I, JESSE ALEXANDER, a citizen of the United States, residing in Clinton Township, in the county of Vermilion and State of Indiana, have invented a new and useful Baling Press, of which the following is a specification, reference being had to the accompanying drawings and to the letters and figures of reference marked thereon.

This invention relates to a portable baling-press of the type that is designed as a double-acting press to form bale after bale of hay or other substance in each of the opposite ends thereof and to be operated by means of an explosion-engine or by horse power, the invention having reference more particularly to means for compactly pressing the hay or other substance into bales, and means for applying power to press the substance.

An object of the invention is to provide an efficient and a rapid baling-press which shall be so constructed as to be simple and not costly in production, and to be capable of turning out the maximum number of bales in order to save time.

Another object is to provide an improved double end baling-press which shall be adapted to be operated at the minimum cost and with few attendants in proportion to the output of bales; a specific object being to eliminate idle movements in the baling operations.

A further object is to provide simple and efficient gearing in baling-presses which may be constructed at a small cost and of strong and reliable design and which shall contribute to the efficiency of the baling-press, which baling-press shall not be liable to derangement in operation but shall be durable and economical in use.

With the above-mentioned and other objects in view, the invention consists in a baling-press having a duplex baling-chamber provided with a single double-acting rammer, the baling press being provided with novel gearing for operating the rammer; and, the invention consists also further in the parts and combinations and arrangements of parts as hereinafter particularly described and further defined in the appended claims.

Referring to the drawings,—Figure 1 is a side elevation of the improved baling-press; Fig. 2 is a fragmentary vertical longitudinal section showing particularly the actuating gearing of the baling-press; Fig. 3 is a top plan of Fig. 2 in which parts are in slightly different positions as may occur in operations; Fig. 4 is a fragmentary section approximately on the line IV—IV in Fig. 2; Fig. 5 is a transverse sectional elevation taken on the axis of rotation of the gearing unit; Fig. 6 is a fragmentary vertical longitudinal section centrally of the baling-chamber and rammer on an enlarged scale. Fig. 7 is a transverse section of the baling-chamber and the rammer approximately on the line VII—VII in Fig. 6; Fig. 8 is a fragmentary top plan of the baling-chamber; Fig. 9 is a fragmentary side elevation of the baling-chamber; Fig. 10 is a fragmentary section on an enlarged scale approximately on the line X—X in Fig. 9; Fig. 11 is a fragmentary sectional detail on an enlarged scale approximately on the line XI—XI in Fig. 9; and, Fig. 12 is a fragmentary sectional elevation of the rear end of the duplex baling-chamber.

Similar reference characters in the different figures of the drawings indicate corresponding elements or features of construction herein referred to in detail.

A practical embodiment of the invention comprises a main frame having two side bars 1 and 2 of suitable length, portions of the side bars having horizontal guides 3 and 4 respectively on the inner sides thereof, the bars being oppositely arranged in parallel order at a suitable distance apart and are secured to a box 5 suitably located at a distance from the forward end of the frame. An improved baling-chamber is provided which comprises a bottom 6 and sides 7 and 8 to hold the substance to be baled, the top of the baling-chamber being provided with two hoppers 9 and 10 suitably spaced apart, and top plates 11 and 12 connected to the sides and extending from the hoppers respectively and provided with slots 13 and 14 to receive the division blocks customarily used. The bottom 6 extends in opposite directions beyond the sides of the baling-chamber and the forward portion is suitably secured to the frame bars 1 and 2. The baling-chamber has outlet portions 15 and 16 that are designed to frictionally retard the outgoing bales, being of the usual or any desired construction, in which the bales are customarily tied and retarded so as to afford resistance to pressure of the rammer while forming other bales in succession. At one end of the baling chamber sides, they are provided with suitable latches 17 and 17' and at the opposite end with reversely arranged latches 18 and 18', to temporarily hold division blocks 19 while substance is being packed against them. A long rammer 20 having squared opposite ends is movably arranged in the baling-chamber and provided with rollers 21 and 21' that are supported upon the bottom 6. The bottom of the rammer has a centrally arranged lug 22 fixed thereon that extends through a longitudinal slot 23 made in the bottom 6, whereby the rammer is operated.

A feeder frame is provided which comprises arch bars 24 and 25 that extend from one to the other of the hoppers and are preferably supported thereby. Feeder arms 26 are supported on a shaft 27 connected to the arch bars, the arms being suitably curved to permit the ends to pass downward through the hopper 9 and they are provided with operating arms 28 to which links 29 are connected that are pivoted to a boss 30 fixed on the top of the rammer 20. For feeding substance placed in the hopper 10 reversely arranged feeder arms 26' are mounted on shaft 27' supported by the arch bars and provided with operating arms 28' operated and controlled by links 29' pivotally connected thereto and also to a boss 30' fixed on the top of the rammer, the boss being suitably located apart from the boss 30.

Preferably the baling-chamber is provided with tuckers having shafts 31 and 31' arranged in the lower portions of the hoppers and having plates 32 and 32' thereon respectively to engage the bottoms of the hoppers adjacent to the top plates 11 and 12 respectively, each shaft having an arm 33 fixed thereto at the outer side of the hopper, the arm being controlled by means of a plunger 34 connected thereto and guided in a dash-pot 35 secured to the baling-chamber side and supporting a coil spring 36 which is under compression against a collar 37 fixed to the plunger, so as to yieldingly hold the tucker plate at an inclination in the baling-chamber to guide the substance and prevent it from catching against the adjacent side of the bottom of the hopper.

The rammer 20 is forcibly moved to and fro by means of a rod 38 that is connected to the lug 22 and to a crosshead comprising a yoke 39 and a cross-bar 40 that is movably supported by the guides 3 and 4, the crosshead being forcibly moved by means of a power screw 41 threaded in the crosshead and having a collar 42 that is guided in the box 5, the screw having a bevel pinion 43 fixed thereto adjacent to the box. A hollow pillar 44 is vertically arranged between the frame bars 1 and 2 and provided with bracket arms 45 that are secured to the frame bars and support the pillar, the lower end of the pillar having a base projection 46 thereon. The pillar has a suitable number of lateral radial arms 47 fixed thereto that are arranged higher than the frame bars 1 and 2 and support a circular gear rack 48 having gear teeth 49 on its inner side. The top of the rack is preferably provided with a suitable number of guide rollers 50. The pillar has a center shaft portion 51 on its top that is diametrically smaller than the main portion of the pillar, the top of the main portion being designed as a rotary table-bearing which supports a center-bearing 52 that is rotatably guided on the shaft portion 51 and has arms fixed thereto comprising upwardly extending portions 53 and horizontal portions 54 extending therefrom, to the under side of which an annular table 55 is fixed so as to rotate slightly above the rack 48, and the under side of the table has an annular groove 56 therein that is concentric to the shaft portion 51 and receives the rollers 50 to assist in guiding the table. The table supports hangers 57 on which rollers 58 are rotatably mounted against the under side of the rack 48. The under side of the table is provided with inwardly facing gear segments 59 and 59' oppositely arranged adjacent to the edge of the table, each segment being slightly less than one-quarter of the circumference of the table in length, and the table is provided also with two smaller gear segments 60 and 60' oppositely arranged and facing outwardly and arranged so as to be intermediate of the inwardly facing gear segments, so as to be concentric to the axis of rotation of the table and to alternately engage a pinion 61 that is fixed on a vertical shaft 62 rotatably supported in a boxing 63 on the frame bars 1 and 2 and preferably connected with the box 5, the shaft having a bevel pinion 64 fixed thereto that engages the pinion 43 to rotate the screw 41. The table is provided at its inner edge with a journal bearing 65 having a cap 66 on which a brace 67 is fixed that is connected to the central portion 52 of the table and supports a pivot 68. Preferably a collar 69 is secured to the shaft portion 51 above the table center 52. A driving shaft 70 is vertically arranged in the bearing 65 and in a bearing bracket 71 secured upon the table 55, and it has a bevel gear-wheel 72 fixed to its upper portion and a pinion 73 fixed to its lower portion in engagement with the gear teeth 49, whereby to rotate the table. The pinion 72 may be rotated by any suitable power gearing mounted upon the table.

Preferably an explosion engine 74 is mounted upon the table 55, preferably upon the horizontal arm portion 54 and partially supported on a beam 75 arranged upon the table, the crank shaft 76 of the engine being provided with a loose bevel gear wheel 77 that is suitably located and engages the gear wheel 72. The crank shaft is provided with clutch teeth 78 which may be on the hub of a fly-wheel customarily secured to the crank shaft. A clutch member 79 is splined on the hub of the gear wheel 77 so as to be moved into or out of engagement with the clutch teeth and is operated by means of a shifting lever 80 mounted on the pivot 68 and having a controlling arm 81 provided with a fork 82 arranged at the top of the shaft portion 51 of the pillar. A rock-shaft 83 is supported on the bottom of the pillar 44 and has an arm 84 fixed thereto that is connected to a rod 85 which extends upward to the pillar and has a spool-shape head 86 fixed thereto that is embraced by the fork 82 so as to permit the fork to turn about the spool, while the spool may push the fork up or down to operate the arm 82. A suitable hand-operated latch lever 87 is secured to the rock-shaft 83 whereby to clutch the operating gearing of the baling-press to the explosion engine.

To permit the operating gearing to be actuated by horse power a draft beam 88 is provided which has a yoke 89 that is removably connected to the horizontal portion 54 of one of the arms of the rotary table, and a pole or rod 90 is connected to the table to which the horses may be tied for leading them in a circular path.

The forward portions of the frame bars 1 and 2 are mounted on a suitable truck 91, and the baling-chamber is mounted on a suitable rear truck 92 to permit the baling-press to be moved from place to place.

In practical use, when the rotary table 55 is actuated either by means of horse power or engine power, the gear segments under the table rotate the pinion 61 alternately in opposite directions, resulting in the wheel 64 rotating the wheel 43 and the power screw 41 alternately in opposite directions, whereby the rammer 20 by means of the rod 38 is moved forcibly to and fro in the baling-chamber, the rammer synchronously operating and controlling the feeder arms, an attendant placing hay or other substance into the hoppers alternately to be packed into the baling-chamber following the withdrawal of the rammer from beneath the hoppers alternately. The substance is tightly packed in the baling-chamber, tied as usual and forced out of the baling-chamber in opposite directions, according to common practice.

Having thus described the invention, what is claimed as new is—

1. A baling-press including a baling-chamber having a longitudinal slot in its bottom, two hoppers spaced apart on the top of the baling-chamber, a rammer in the baling-chamber and having a lug on its bottom extending through said slot, the rammer being movable under the hoppers alternately and having two bosses fixed on its top, operating means for the rammer connected with said lug, two arch bars supported by the two hoppers, two shafts rotatively supported by the arch bars, two feeder arms secured to one of the shafts to operate in one of the hoppers, two feeder arms secured to the remaining one of the shafts to operate in the opposite one of the hoppers, two operating arms secured to the shafts respectively, and two links connected to said bosses respectively and also to the operating arms respectively.

2. A baling-press including a duplex baling-chamber having a longitudinal slot in its bottom, two hoppers spaced apart on the top of the baling-chamber, a rammer in the baling-chamber and having a lug on its bottom extending through said slot, the rammer being movable under the hoppers alternately, a frame secured to the baling-chamber and provided with a fixed box, a crosshead movably guided on the frame, a rod connected to the crosshead and to said lug, a screw threaded in the crosshead and having a collar fixed thereto and guided in said box, and means to rotate the screw.

3. In a baling-press, the combination of a baling-chamber having a hopper thereon, a rammer movably supported in the baling-chamber and having a boss on the top thereof, a pivot shaft supported above the baling-chamber and partially on one side of the hopper, a curved feeder arm supported by the pivot shaft and having an operating-arm, a link pivoted to said operating-arm and to said boss, and means to move the rammer connected therewith.

4. In a baling-press, the combination of a baling-chamber comprising a bottom and sides and also a top, said top having an opening therein, a hopper on said top, a rammer movably supported in the baling-chamber, a shaft rotatively supported at the tops of said sides and adjacent to one side of the hopper and having a tucker blade and also a crank fixed thereon, a dash-pot secured to one of said sides, a coil spring seated in the dash-pot, a plunger connected to said crank and having a collar thereon supported upon said spring, and means to move the rammer connected therewith.

In testimony whereof, I affix my signature in presence of two witnesses.

JESSE ALEXANDER.

Witnesses:
HARRY B. WHETSEL,
FRED MARSHALL.